May 4, 1954 W. J. SERVILLA 2,677,179
HAIRCUTTING SHEARS
Filed July 27, 1950 2 Sheets-Sheet 2
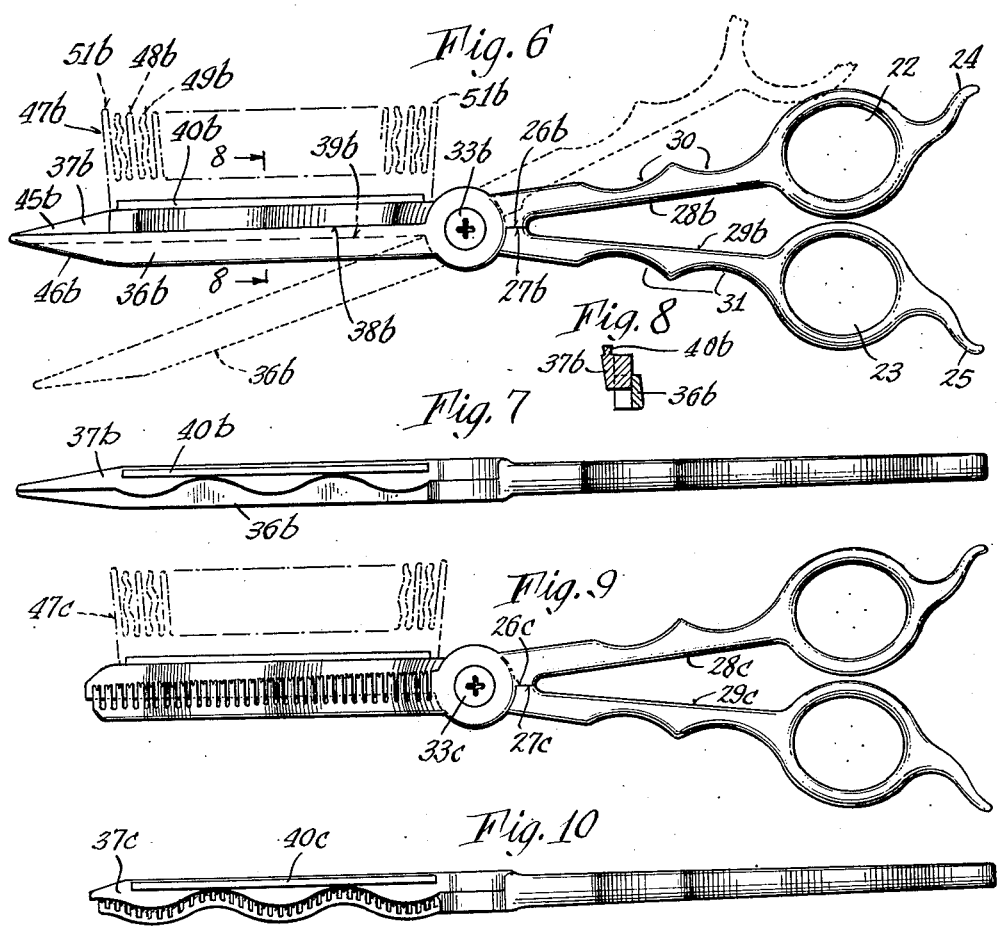
Inventor
William J. Servilla
By Johnson and Kline
Attorneys Patented May 4, 1954

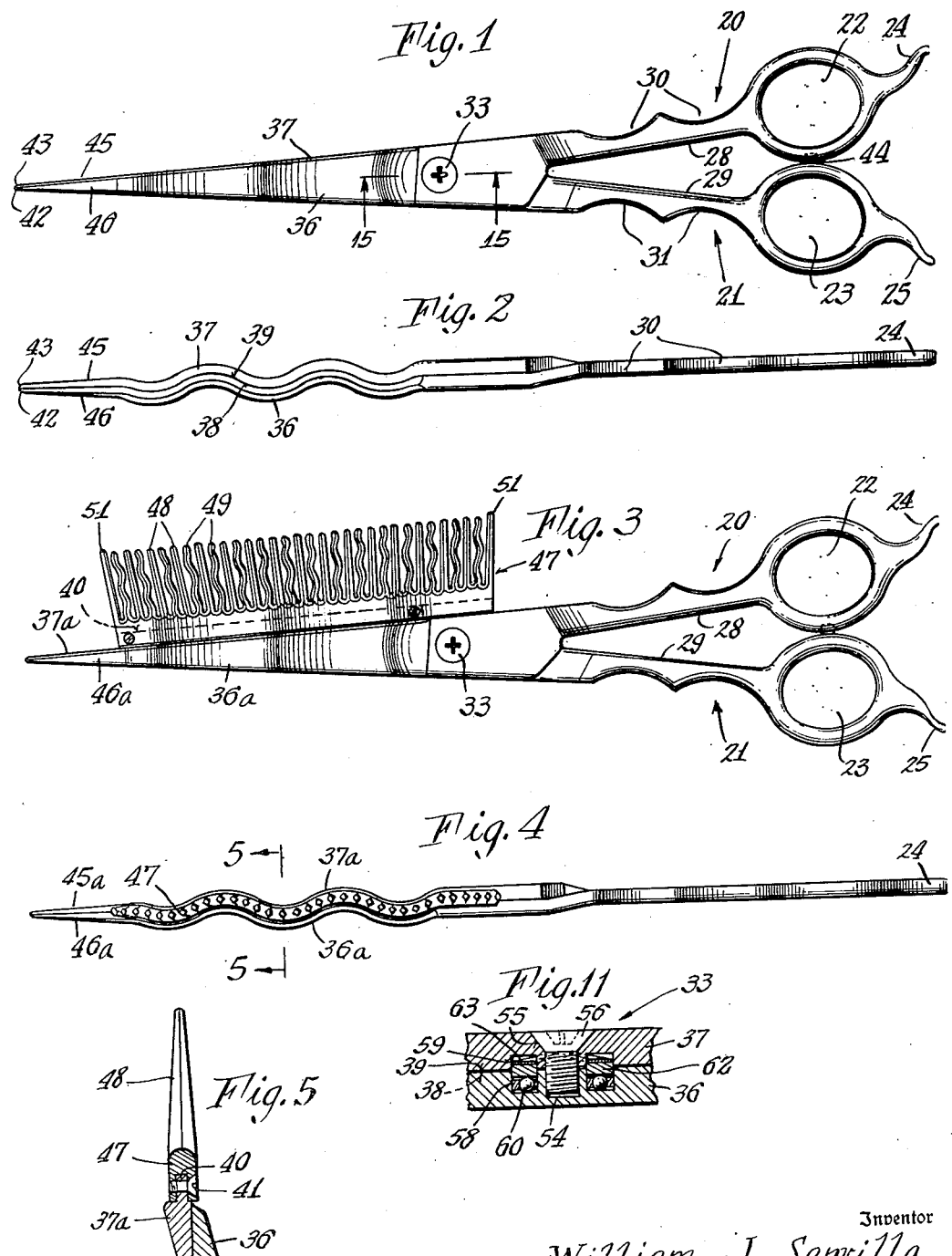

2,677,179

UNITED STATES PATENT OFFICE 2,677,179

HAIRCUTTING SHEARS

William J. Servilla, Bridgeport, Conn.

Application July 27, 1950, Serial No. 176,136

4 Claims. (Cl. 30—256)

The present invention relates to haircutting shears and more particularly to haircutting shears having an improved form of cutting edge especially of use in the trimming and dressing of ladies' hair.

Shears used at the present time in the cutting of hair in beauty salons or in barber shops comprise two pivotally connected members having straight cutting edges on one side of the pivot and handle portions with finger and thumb grips on the other side of the pivot. Manipulation by the operator of the shears by relative pivotal movement of the finger and thumb grips causes corresponding relative pivotal movement of the straight cutting edges past each other whereby the hair positioned between these edges is cut.

In the cutting of hair, considerable care must be exercised to obtain an even, gradual taper to give a becoming appearance and especially to avoid the creation of ridges or steps in the finished haircut. Nothing marks the work of an amateur or an inexperienced operator so much as the appearance of notches or angular ridges which present a very uneven and unattractive appearance. A haircutting stroke by an inexperienced person with the straight cutting edges of the shears could very easily result in a notch or ridge, the only cure to which is an impatient and embarrassed wait for a long enough time until sufficient hair has grown to permit a corrective trimming. Even when the shears are being used by an experienced operator, a careless stroke could easily result in the same undesirable appearance and a similar unpleasant experience.

It is a purpose of the present invention to design the shape of the cutting edges of haircutting shears in such a way as to lessen the possibility of the creation of such undesirable ridges or steps in the finished haircut.

It is a further purpose of the present invention to design the shape of the cutting edges of haircutting shears whereby unbecoming straight abrupt steps are avoided and an attractive wavy coiffure is possible.

An additional purpose of the present invention is to provide haircutting shears which are quieter and more efficient in their operation.

An advantageous feature of the present invention is the provision of haircutting shears designed for easier and more reliable manipulation of the cutting edges by providing for better gripping of the shears by the fingers of the operator.

A further advantageous feature of the present invention is the provision of shears capable of being used with equal facility and dexterity by right-handed or left-handed persons, or reversible in use by the same hand of the operator, whereby the shears may be picked up in any position and used without shifting or reversing the same.

Other purposes, advantages and features of the invention will appear in the following description of the preferred embodiment thereof with reference to the accompanying drawings in which:

Figure 1 is a plan view of haircutting shears including the improvements of the present invention.

Fig. 2 is a view in elevation of the haircutting shears of Fig. 1.

Fig. 3 is a plan view of a modification of the haircutting shears of Fig. 1.

Fig. 4 is a view in elevation of the haircutting shears of Fig. 3.

Fig. 5 is a cross-sectional view of the shears in Fig. 4, taken on the line 5—5 therein.

Fig. 6 is a plan view of another modification of the shears shown in Fig. 1.

Fig. 7 is a view in elevation of the shears shown in Fig. 6.

Fig. 8 is a cross-sectional view of the shears shown in Fig. 6, taken on the line 8—8 therein.

Fig. 9 is a plan view of thinning shears to which the concept of the present invention has been applied.

Fig. 10 is a view in elevation of the thinning shears shown in Fig. 9.

Fig. 11 is a fragmentary cross-sectional view showing the ball bearing pivot construction of the shears of Fig. 1, taken on the line 15—15 therein.

In the embodiment of the invention shown in the drawings, the improved haircutting shears comprise handles 20 and 21 wherein are formed openings, or finger and thumb grips 22 and 23, which are similar in size and shape. As illustrated, the openings are elliptical in shape to depict a preferred embodiment. The material forming the openings for the finger and thumb grips is smoothly and symmetrically bevelled on both faces so that the thumb and finger may fit either opening from either direction.

In shears hitherto used in the art, it was common practice to accentuate the bevel in one direction only, to thus provide shears capable of comfortable and efficient use by one particular hand only. By having an equal sloping edge on both sides of the opening, facility is afforded for either hand and the shears are of use for either right-handed or left-handed operators, or reversible in use for the same hand of the operator. In normal use, it will be the ring finger which will be in one of the openings and the thumb which will be in the other opening.

The finger and thumb grips are each provided with finger braces 24 and 25, which are also similarly shaped, the use of which provides for support of the little finger, no matter which opening the ring finger or the thumb is in. Thus, the shears may be picked up in either hand from any position with the blade points facing outwardly and the ring finger and thumb inserted in the openings from either direction and the little finger will naturally fall upon one of the finger braces whereby control over the shears is obtained immediately without any shifting or reversing of the handles of the shears.

In shears hitherto used having finger braces, such as the French type of shears which has one finger brace and is the type almost universally used today, the finger brace extends outwardly in a single curve which results in an outwardly directed point capable of scratching and irritating the skin with which it occasionally would come into contact. By providing a second curve in the reverse direction to form a double or an ogee curve, as shown in Figs. 1 and 3, for example, the end of the finger brace is caused to extend in an inward direction so that the surface exposed to possible occasional contact with the skin is smooth and curved to avoid any possible scratching or irritation thereof.

In the German type of shears, no finger braces are provided and the possibility of scratching and irritation is, of course, absent but the loss of support for the little finger more than offsets the possible advantages arising therefrom with the result that the German type has never become too popular.

With the thumb, little finger, and ring finger in the described positions, the middle finger and the forefinger will naturally fall upon shanks 28 or 29 of the handles 20 or 21. Suitable finger recesses 30 and 31 are formed in the outer portions of the shanks 28 and 29 to provide gripping surfaces for the middle finger and forefinger so that they will firmly rest on and grip the shank of the handle. The use of these finger recesses on each shank portion also continues the idea of the use of the shears by either hand, or the reversible use with one hand.

The handles 20 and 21 are mounted to be rotated about a pivot 33, whereby blades 36 and 37, formed integrally with the handles 20 and 21 respectively and extending beyond the pivot 33, are capable of relative movement. The blades have inner edges 38 and 39 which are sharpened to provide cutting edges whereby relative movement of the cutting edges past each other will cut any hair positioned therebetween.

As shown in Fig. 2, the blades 36 and 37 are so designed as to present an undulating or wavy appearance which extends from a point immediately adjacent the pivot 33 to a point short of the tips 42 and 43 of blades 36 and 37. This provides for remaining end portions 45 and 46 which are straight and extend to the tips of the blade, as shown. By placing these straight portions in contact with the skin, better control over the shears is obtained whereby close work at the temples or near the ears is possible.

Hair which is cut by the undulating portion of the shears presents a similar undulating or wavy appearance corresponding to the contour of the cutting edges and thus a desirable wave is imparted to the hair.

The undulating portion of the blade is also of great benefit in the cutting of hair by avoiding to a great extent the possibility of cutting notches or creating ridges. Notches, for example, are commonly caused by cutting too deeply along a straight line whereby all of the hairs along that line are shorter than the hairs along adjacent lines. When shears having undulating blades cut through the hair, no such straight line of hairs of the same height is created but an undulating wave is formed. The hair never forms any angular portions or sharp lines but naturally tends to blend in with the cut hair adjacent thereto to form an even gradual taper.

A bumper 44 preferably made of rubber, leather, or other resilient material, is inserted within one of the finger or thumb grips and allowed to protrude slightly therefrom and to contact the opposing grip. The bumper 44 may be secured within the grip by any suitable means such as screw threading, or adhesive means, etc. Whenever the shears are closed, the finger and thumb grips will not clash together noisily but will come together noiselessly and with an inaudible closing, being cushioned in such action by the bumper 44.

Referring to Fig. 3, shears are illustrated having a handle portion identical to the handle portion of the shears shown in Figs. 1 and 2 and to which similar reference numerals have been applied. However, the blade portion 37a is modified to form a flange 40 standing higher than the opposed blade 36, as shown in Fig. 5. To this flange a comb 47 having a groove in its lower edge to cooperate with the flange 40 is secured by any suitable means such as fastening screws, or rivets, etc. The comb is of such a shape as to follow the contours of the undulating shear blades closely. The portion close to the pivot will necessarily be straight inasmuch as the blade is straight at that point but the portion on the undulating part of the blade will be correspondingly undulated.

In cutting hair, considerable manipulation of the hair is often necessarily done with the fingers in conjunction with the comb and shears. This is known as "finger work."

In normal comb and shears work, the comb is held in the left hand and the shears in the right hand (assuming a right-handed operator). When it is desired to engage in "finger work," the shears are shifted within the right hand so that the comb may be transferred thereto. The hair is then combed until the desired formation is attained and then it is grasped by the free left hand to which the comb is now returned to be held by the thumb and forefinger out of the way. The shears are then shifted with the right hand and the thumb and proper finger are inserted in the grips and a cut of hair taken. The shears are then shifted within the right hand so that the comb may be transferred thereto and this procedure is repeated until the "finger work" is completed.

It is readily apparent that such a procedure is awkward and undesirable. Considerable skill and dexterity is required for the proper manipulation of the comb and shears and, at best, "finger work" is a slow process and leaves much to be desired in the way of efficiency and economy.

Additionally, considerable hair is cut and falls into the uncut hair and is frequently entangled therein. A clean, sure sweep of the comb is difficult inasmuch as the shears are held in the same hand at that time and it is quite likely that a snarl or tangle will cause the operator to pull or jerk the comb to the annoyance of the patron. Additionally, it is possible that the operator whose attention is essentially on the comb, will forget about the shears and quite conceivably scratch and irritate the scalp of the patron with the points of the shears.

In accordance with the embodiment of the invention shown in Figs. 3 and 4, the shears and attached comb may be held in a normal position in the right hand and the comb 47 which is mounted on the shears may be swept through the hair until the desired hair conformation is achieved. The hair is grasped in the other hand which has been free all this time and the shears are immediately run through the hair to cut the same. No transfer of any article is required nor is any shifting necessary, and a more efficient and convenient procedure is involved.

Additionally, as shown in Fig. 3, the comb 47 is specially designed to avoid the pulling or jerking through snarls or tangles. The teeth are flared outwardly and comprise spaced alternate straight teeth 48 and wavy, undulating teeth 49. The teeth close to the central portion of the comb extend outwardly perpendicularly to said comb body, whereas the teeth at the outer portions of the comb are inclined away from the teeth at the central portion and flare outwardly, as shown.

The body of the comb is, itself, of undulating form which cooperates with the alternating straight teeth 48 and undulating teeth 49 to gently fluff the hair up and easily break up any snarls or tangles present and to be capable of being drawn through the hair without any tugging or jerking.

The straight teeth 48 and the undulating teeth 49 are flexible and are spaced from each other unless a sufficiently heavy lock of hair should force one tooth to contact an adjacent tooth. This, however, will occur but rarely, if at all.

The outermost teeth 51, 51 are extended to a greater length to form parting spikes to enable the parting of the hair with facility.

In Fig. 5 is illustrated in detail a preferred means of securing the comb body 47 to the blade 27a of the shears. An upstanding undulating flange-like portion 49 is adapted to enter an associated groove in the lower portion of the undulating comb body or backbone and to be secured therein by screw member 41. The comb is thus snapped into position directly and cannot slide in either direction due to the restraint of the undulations in the dovetail and groove.

The teeth of the comb are tapered and are smoothly shaped to avoid catching any of the hairs. The ends of the teeth are rounded to avoid scratching or irritating the scalp and are equally spaced along the straight line formed thereby. Should it be desired that the comb teeth conform more to the contour of the head, the ends of the teeth could be arranged to form a concave line wherein the teeth ends would be equally spaced.

Modified haircutting shears are shown in Fig. 6 in which are included several advantageous features of the present invention. The cushioning bumper has been removed from the finger and thumb grips and has been replaced by other means also calculated to do away with the clicking noises produced by the blades and handles in the operation of the shears. Portions 26b and 27b of the shanks 28b and 29b adjacent the pivot 33b are formed of greater thickness than the other parts of the handle. These portions 26b and 27b are carefully ground down and finished so as to provide flat opposed meeting surfaces to define the limits of the closing movement of the handles and blades of the shears. This position is so designed that it occurs prior to the complete closing of the handle grips of the shears which are thus arrested while still a small distance apart. As a result, the only parts of the shears to make positive abutting contact with one another are the surfaces 26b and 27b which, being close to the pivotal center, do not have much relative movement nor any great relative speed with respect to each other and come together easily and quietly without any audible closing contact, to thereby decrease the noise of impact between the contacting handles.

On the other side of the pivot 33b, the cutting edges of the blades 36b and 37b are cut away sufficiently so that the cutting edges, when in closed condition, are brought close to and substantially parallel to the center line of the shears. In such configuration, the blades are, in effect, eccentrically mounted with respect to the pivot 33b in that the center line of the blade does not pass through the center of the pivot. The cutting edge 38b of the lower blade 36b extends slightly above the center line, whereas the cutting edge 39b of the upper blade 37b extends slightly below the center line to overlap the lower blade to only a small degree. The value of such small overlap is readily apparent when the shears are opened. In the usual type of shear blade, such as illustrated in Figs. 1 and 3, the shear handles must be opened to a considerable extent before the cutting blades are completely open or before any appreciable length of cutting blade is exposed. By cutting away the blades and reducing the amount of overlap thereof, the blades open more quickly to a fully open configuration, thus decreasing the work for the fingers of the operator and increasing the length of blade readily available for cutting hair. It is, of course, quite obvious that the cutting edges of the shears illustrated in Figs. 1 and 3, for example, could be similarly cut away to reduce the amount of overlap whereby similar advantages could be realized.

Additionally, the handles are still slightly open when the cutting stroke is arrested which cushions the closing movement of the grips. The resiliency of the handles which are still separated permits a slight yielding thereof which further enhances the smooth action involved during manipulation of the shears. Although this would not appear to have any great effect, it is sufficient to lessen to a great degree the muscular fatigue in the hand and wrist muscles resulting from continuous shear operation and to eliminate the "tired" operator who is so often responsible for carelessly trimmed and unbecoming haircuts.

The dotted outline of blade 36b has been drawn in Fig. 6 to illustrate this rapid opening of the blade to the fully open position. As shown, the blade is open only a matter of less than 20° and the full length of the cutting edge is exposed.

In the shears shown in Figs. 6 and 7, the blades are made heavier by forming the undulating surface merely in the inner cutting side and allowing the outer side to remain full to provide a flat outer surface and a thick upper surface. As shown in Fig. 8, a dovetail 40b is formed on the upper surface of the blade 37b to perform a somewhat similar function to the comb-holding flange 40. A comb 47b which also comprises a row of alternating straight teeth 48b and undulating teeth 49b and parting spikes 51b, 51b at the ends of the row has formed in the body or backbone portion thereof a dovetail groove which corresponds to and fits the dovetail 40b. Comb 47b is straight and is capable of being slid along the dovetail 40b into position on the blade 37b of the shears. Sufficient friction is present in the sliding fit to hold the comb against any accidental or undesirable movement. The outline of the comb has been drawn in Fig. 6 to illustrate its operating position and to demonstrate that such position does not interfere with the operation of the shears.

Although a straight comb has been found to operate successfully with shears having undulating cutting edges, an undulating comb yields superior results when the undulations thereon are aligned with the undulations of the shears. It is believed that the undulating comb prepares the hair in better fashion for passage of and cutting by the undulating shears through cooperation of the aligned undulations.

Thinning shears have been illustrated in Figs. 9 and 10 to show the applicability of the concept of a slidably removable comb 47c to this special type of shears. The use of the abutting portions 26c and 27c immediately adjacent the pivot 33c of the shanks 28c and 29c to silence the operation of the shears similar to that illustrated in Figs. 6 and 7 is shown here. A dovetail 40c is formed on the upper surface of the cutting blade 37c and cooperates with a dovetail groove formed in the lower body or backbone of the comb 47c. Although a dovetail groove is illustrated as a preferred means of securing the comb to the shears, it is obvious that any other similar groove or securing means could be used.

It is, of course obvious that a comb having undulations could be secured to the shears shown in Figs. 6 and 9 by forming the dovetail differently and using other flanges or securing means for the comb body.

In Fig. 11 is illustrated a cross-sectional view showing details of the improved roller bearing surface of the pivot 33 whereby friction is greatly reduced and the operation of the blades is made very easy, concomitant to provision for guiding the moving blades along a truer line.

A tapped recess 54 is provided in the blade 36 and a correspondingly aligned countersunk bore 55 is formed in the blade 37. A screw member 56 is adapted to penetrate the bore 55 and be threaded into the tapped recess 54 whereby the blade members 36 and 37 may be pivotally secured together. Inasmuch as the recess 54 does not extend entirely through the blade 36, a smooth surface is provided on the exterior thereof, thus creating a better appearance as well as avoiding the possibility of the catching or snagging of hairs which could occur if there were any projections, as there usually are in the conventional shears which have screws which penetrate completely through the blades.

Opposed annular recesses 58 and 59 are provided in the blades 36 and 37 respectively and these recesses are of equal inner and outer diameter in aligned opposition and are concentric with the recess 54 and bore 55. A ball bearing cage 60 is positioned within the recess 58 and is of a diameter as to fit therein with a smooth sliding fit. The thickness of the cage is such that the uppermost surface of the balls contained therein falls short of the top of the recess 58. A spacing washer 62 is positioned on top of the balls of the ball bearing cage 60 and is also of a diameter as to fit within recess 58 with a smooth sliding fit. The thickness of spacing washer 62 is such that it fills the space remaining in recess 58 above the uppermost surface of the balls and protrudes a similar distance beyond the upper surface 38 of the blade member 36. A spring flex washer 63 is positioned on the spacing washer 62 and the blade member 37 assembled as shown in Fig. 15. The recess 59 is similar in diameter to recess 58 and the spacing washer 62 fits therein also with a smooth sliding fit. Screw member 56 is then passed through the bore 55 and threaded into the tapped recess 54. Tightening of screw member 56 to various degrees will flex the spring member 63 and vary the frictional contact between the surfaces 38 and 39 of the blade members 36 and 37.

When the blade members 36 and 37 are rotated about pivot 33, the balls in the ball bearing cage 60 will roll on the bottom surface of the recess 58 and the undersurface of the spacing washer 62 and provides for a smooth rolling frictionless contact. Such a rolling surface is far superior to hitherto used sliding surface contact which involves greater frictional forces.

The position of the spacing washer is such that its edge surface contacts both recesses 58 and 59 and serves as a guide therefor. The thickness of the spacing washer 62 is such that it will effectively contact the surface of recess 59 throughout all of the adjusted positions of blade member 37, and thus the spacing washer 62 comprises a bearing surface as well as a rolling surface.

Such a bearing means is completely quiet due to the absence of large frictional sliding members and adds to the silent nature of the shears.

It will be found in using haircutting shears of the present invention that a more becoming wavy coiffure is possible and that unattractive ridges or notches are more easily avoided. It will also be found that less experience is required to give a proper haircut with the haircutting shears described. Less muscular fatigue is created in the fingers and hands of the operators and a quieter operation prevails.

As shown in the drawings, the pivot 33 comprises a Phillips-head screw having a pair of crossed slots for the admission of the special Phillips screw driver. These slots are made shorter than the overall diameter of the head of the screw so that the circumference thereof and the conical underhead surface are smooth and uninterrupted. If the slots were permitted to extend to the very edge of the screw head, sharpened edges would be exposed to the conical seat upon which the screw head rests (see Fig. 11) and considerably increased wear and tear would result which would relatively quickly ruin the accuracy of the shears. Additionally, the head of the screw gives a neater and more finished appearance to the shears.

The invention in its broader aspects is not to be limited to the specific embodiments shown and described but modifications and departures therefrom may be made within the spirit of the invention. For example, the comb 47d shown in Fig. 11 has been tapered so that the ends of the comb teeth form a line inclined to the cutting blade 39e rather than parallel thereto as shown in Fig. 3. Such a line, if extended, will pass substantially tangent to the finger grip 22 and provides for an easier use of the comb on the shears.

If the teeth of the comb are parallel to the cutting blade, then the shears have to be held at a slight angle to place the comb in proper position. However, if the tapered feature is introduced, the shears may be held in normal position to provide for comb operation. Such a tapered end has been found of particular advantage when used in conjunction with barbers' shears in the cutting of men's hair, but could be used with other shears. In a similar fashion, the advantages and improvements described and shown herein could be used with other types of shears.

Variations and modifications may be made within the scope of the claims and portions of the improvements may be used without others.

I claim:
1. In haircutting shears of the character described, cooperating blades having wavy cutting edges extending along a major portion of said cooperating blades to provide for wavy haircutting and straight cutting edges extending along a minor portion of said cooperating blades to provide for close hair trimming; pivot means for mounting said cooperating blades for relative movement, said major portion of said blades extending from a point adjacent the pivot means to a point adjacent the tips of the blades and said minor portion of said blades extending from the major portion to the tips and being of a length less than one-half the length of the major portion; and operating handles forming integral extensions of said cooperating blades on the opposite side of said pivot, whereby relative movement of said cooperating blades may be brought about by relative movement of said operating handles, said cutting edges being waved in a plane substantially perpendicular to the plane of blade movement.

2. In shears of the character described, cooperating blades having scalloped cutting edges extending along a major portion of said blade and spaced straight edges extending along a minor portion of said blade; pivot means for eccentrically mounting said cooperating blades to provide for a minimum overlap whereby said blades are capable of being fully opened and closed with a relatively small angular rotation of the cooperating blades, said major portion of said blades extending from a point adjacent the pivot means to a point adjacent the tips of the blades and said minor portion of said blades extending from the major portion to the tips and being of a length less than one-half the length of the major portion; and operating handles forming integral extensions of said cooperating blades on the other side of said pivot, whereby relative movement of said cooperating blades may be brought about by relative movement of said operating handles, said cutting edges being waved in a plane substantially perpendicular to the plane of blade movement.

3. In haircutting shears having cooperating pivoted blades having cutting portions and operating handles disposed on the opposite side of the pivot, the improvement which comprises providing the cutting portion of said cooperating blades with wavy cutting edges waved in a plane substantially perpendicular to the plane of blade movement and extending from a point adjacent the pivot for substantially the full length thereof to a point adjacent the tip of the blades for wavy haircutting and with straight edges from the wavy portion to the tips to provide for close hair trimming.

4. The invention as defined in claim 1 wherein said operating handles have finger braces projecting therefrom and comprising opposed ogee curves with the free ends of the braces being curved inwardly.

References Cited in the file of this patent

UNITED STATES PATENTS

| Number | Name | Date |
|---|---|---|
| 95,834 | Price | Oct. 12, 1869 |
| 465,384 | Morgan | Dec. 15, 1891 |
| 826,587 | Linscott | July 24, 1906 |
| 946,441 | Homme et al. | Jan. 11, 1910 |
| 1,103,710 | Tourjee | July 14, 1914 |
| 1,115,104 | Prikla | Oct. 27, 1914 |
| 1,623,130 | Otis | Apr. 5, 1927 |
| 1,885,754 | Natchtigall | Nov. 1, 1932 |
| 1,900,413 | Carpenter | Mar. 7, 1933 |
| 2,059,074 | Whyte | Oct. 27, 1936 |
| 2,343,527 | Boyle | Mar. 7, 1944 |
| 2,370,026 | Elia | Feb. 20, 1945 |
| 2,491,712 | Campbell | Dec. 20, 1949 |
| 2,558,264 | Metcalf | June 26, 1951 |

FOREIGN PATENTS

| Number | Country | Date |
|---|---|---|
| 349,073 | France | May 10, 1905 |
| 3,263 | Great Britain | July 13, 1905 |
| 155,543 | Switzerland | Sept. 1, 1932 |